UNITED STATES PATENT OFFICE.

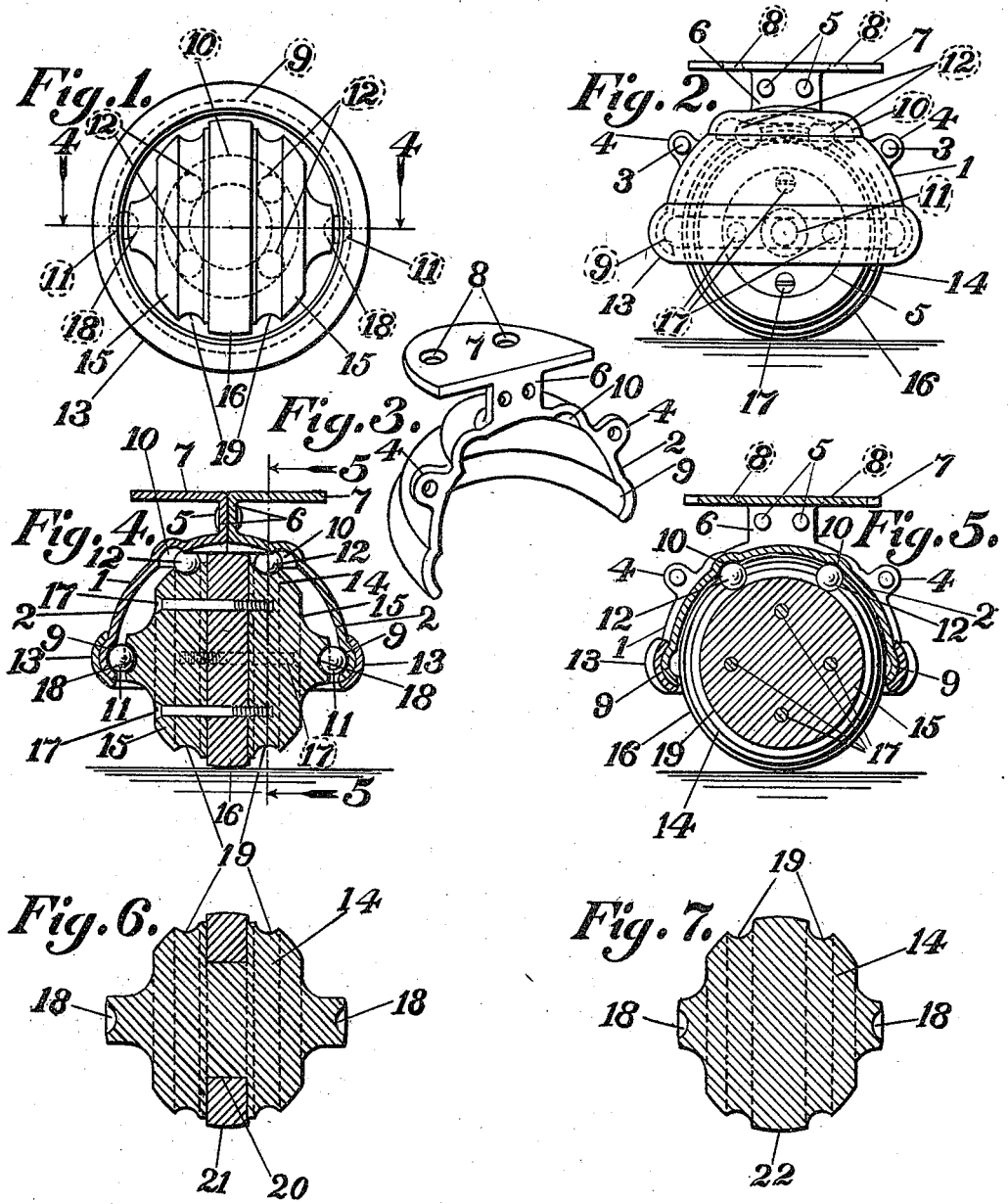

ARTHUR H. SCHAFFNIT, OF ST. LOUIS, MISSOURI.

BALL-BEARING CASTER-ROLLER.

984,855.  Specification of Letters Patent.  Patented Feb. 21, 1911.

Application filed November 14, 1910. Serial No. 592,270.

*To all whom it may concern:*

Be it known that I, ARTHUR H. SCHAFFNIT, a citizen of the United States, residing in the city of St. Louis and State of Missouri, have invented certain new and useful Improvements in Ball-Bearing Caster-Rollers, of which the following is a specification.

This invention relates to furniture casters and rollers, and has for its object to provide an improved ball-bearing roller that is especially adapted for furniture, trucks, safes, and the like.

In the accompanying drawings forming part of this specification, in which like numbers of reference denote like parts wherever they occur, Figure 1 is a bottom plan view of an improved ball-bearing roller embodying the present invention; Fig. 2 is a side elevation of same; Fig. 3 is a perspective view of part of the casing or socket; Fig. 4 is a sectional view on the line 4—4, Fig. 1; Fig. 5 is a sectional view on the line 5—5, Fig. 4; and Figs. 6 and 7 are sectional views of alternate forms of the roller.

The casing or socket 1 is preferably somewhat semi-spherical in shape, and comprises the halves 2 that may be stamped from sheet metal or may be cast, if desired. The halves 2 are secured together by rivets 3 or other suitable means that pass through perforations in lugs 4 borne by said halves and, also, by rivets 5 or the like that pass through perforations in lugs 6 borne by said halves. Lugs 6 bear ears or projections 7 in which perforations 8 are formed to allow screws or other fastening means (not shown in the drawings) to pass therethrough for the purpose of securing the casing 1 to a piece of furniture, truck, safe, or the like, said ears being arranged to hold said casing in an inverted position. Each half 2 is provided interiorly with a semi-annular groove or recess 9, which extends along the lower edge thereof, and, also, with a semi-annular groove or recess 10 that is located in the upper part of same. The grooves 9 and 10 of one half 2 register with the grooves 9 and 10 of the other half 2 in order to form annular runways for antifriction balls 11 and 12, respectively. An annular ring or band 13 encircles the lower part of casing 1 and not only strengthens same, but affords additional means for holding the halves 2 together.

A roller 14 is inserted partly into the interior of casing 1, and comprises two end pieces 15 that are preferably formed of metal and a cylindrical member 16 that is interposed between said pieces 15, said member being formed of wood, rubber, or other suitable material and being the particular part of the roller that bears upon the floor or supporting surface. The end pieces 15 of roller 14 are connected by screws 17 or the like that pass through the member 16 in order to hold said member firmly in place.

Each end piece 15 is provided with a depression 18 that forms a seat for an antifriction ball 12, so as to retain said ball in the runway formed by grooves 9, and, also, with an annular groove or recess 19 that is preferably disposed in a plane extending substantially at a right angle to the horizontal axis of roller 14 in order to retain a pair of balls 11 in the runway formed by grooves 10. The balls 12 form the ends of the horizontal axis of rotation of roller 14 and, when said ball is rotated about its vertical axis, the balls 11 travel circumferentially in grooves 9. The grooves 19 retain the four balls 11 in grooves 10 at all times and, when roller 14 is rotated about its vertical axis, the balls 11 travel circumferentially in grooves 10, but when said roller is rotated about its horizontal axis, the balls 12 travel circumferentially in grooves 19. By this arrangement the roller 14 can be rotated about its vertical and horizontal axes simultaneously, in which event, the balls 11 travel circumferentially in grooves 9 and the balls 12 travel circumferentially in grooves 10 and 19.

In the alternate forms of roller 14 that are depicted in Figs. 6 and 7, the roller 14 is formed in one piece. In Fig. 6, the roller 14 is provided with an annular groove or recess 20 to receive a tire 21 that is formed of rubber, wood, or other suitable material, but in Fig. 7 the central cylindrical part 22 of the roller 14 is diametrically larger than other parts of said roller in order to bear upon the floor or supporting surface.

The balls 11 receive the weight of the piece of furniture, safe, truck, or the like, to which the device is attached, and distribute the load upon roller 14 so as to prevent any of the weight from being thrown upon the balls 12. Any object that is supported by one or more of these devices can be easily moved in any direction with but very little exertion.

I claim:

1. A ball bearing roller including a cup, said cup being formed with an annular horizontal runway at its lower end and with an annular horizontal runway at its upper end, a roller member, a ball in said first named runway engaging the sides of the roller member, said roller member being formed with a pair of spaced annular runways at right angles to its axis, and a ball engaging in each of said last named runways and in said horizontal runway at the upper end of the cup.

2. A ball bearing roller including a cup formed in sections, a roller member in the cup, each of said cup sections being formed at its lower end with an outwardly extending ridge, and a band engaging about the exterior of the sections and being shaped to conformably engage over each ridge of each section.

3. A ball bearing roller including a cup, formed in sections, each section having a cup portion proper, the upper end of each cup portion proper being extended upwardly at right angles to the top part of each cup portion proper to form vertical lugs and then being further extended outwardly at right angles to said first named right angular portions to form ears which are spaced from the top parts of said cup portions proper, said vertical lugs being in abutting engagement, and fastening means passed through said abutting vertical lugs.

4. A ball bearing roller including a cup formed with an annular horizontal runway at its top, a roller member in the cup, formed with a central annular part to bear on the supporting surface and with an annular groove on each side of said annular part, the latter extending outwardly beyond the said grooves of the roller member, and a ball in each of said grooves engaging in said horizontal runway.

In testimony whereof I have hereunto affixed my signature in the presence of two witnesses.

ARTHUR H. SCHAFFNIT.

Witnesses:
GLADYS WALTON,
LOTTIE M. FOX.